United States Patent
Herman et al.

(10) Patent No.: US 12,148,222 B2
(45) Date of Patent: Nov. 19, 2024

(54) ASSISTED VEHICLE OPERATION WITH IMPROVED OBJECT DETECTION

(71) Applicant: Ford Global Technologies, LLC, Dearborn, MI (US)

(72) Inventors: David Michael Herman, W. Bloomfield, MI (US); Akshay Vaidya, Canton, MI (US); Larry Sanders, Monroe, MI (US); Binduhasini Sairamesh, Sunnyvale, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 362 days.

(21) Appl. No.: 17/578,622

(22) Filed: Jan. 19, 2022

(65) Prior Publication Data

US 2023/0230387 A1   Jul. 20, 2023

(51) Int. Cl.
| | |
|---|---|
| *G06V 20/58* | (2022.01) |
| *B60W 30/06* | (2006.01) |
| *B62D 15/02* | (2006.01) |
| *G01B 11/22* | (2006.01) |
| *G01S 13/86* | (2006.01) |
| *G01S 13/931* | (2020.01) |
| *G06T 7/521* | (2017.01) |
| *G06T 7/73* | (2017.01) |
| *G06V 10/141* | (2022.01) |
| *B60Q 1/04* | (2006.01) |
| *B60Q 1/20* | (2006.01) |

(Continued)

(52) U.S. Cl.
CPC ............. *G06V 20/58* (2022.01); *B60W 30/06* (2013.01); *B62D 15/026* (2013.01); *G01B 11/22* (2013.01); *G01S 13/867* (2013.01); *G01S 13/931* (2013.01); *G06T 7/521* (2017.01); *G06T 7/73* (2017.01); *G06V 10/141* (2022.01); *B60Q 1/04* (2013.01); *B60Q 1/20* (2013.01); *B60Q 1/22* (2013.01); *B60Q 1/34* (2013.01); *B60Q 1/44* (2013.01); *B60R 2011/004* (2013.01); *B60R 11/04* (2013.01); *B60W 2300/14* (2013.01); *B60W 2420/403* (2013.01); *B60W 2420/408* (2024.01); *G06T 2207/10152* (2013.01); *G06T 2207/30252* (2013.01)

(58) Field of Classification Search
None
See application file for complete search history.

(56) References Cited

U.S. PATENT DOCUMENTS

| | | |
|---|---|---|
| 7,656,508 B2 | 2/2010 | Iwaki et al. |
| 8,417,021 B2 | 4/2013 | Cipolla et al. |
| (Continued) | | |

*Primary Examiner* — Adam D Tissot
*Assistant Examiner* — Garrett F Evans
(74) *Attorney, Agent, or Firm* — Frank Lollo; Price Heneveld LLP

(57) ABSTRACT

A vehicle control system includes a camera configured to capture image data depicting a field of view proximate the vehicle is disclosed. The vehicle control system further includes a plurality of light sources in connection with the vehicle and a controller. The controller is configured to activate a plurality of lights in an alternating pattern and capture light reflected from at least one object with the camera at a time and corresponding to the alternating pattern of the plurality of lights. In response to variations in the light impinging upon the at least one object from the alternating pattern, the controller is configured to identify a distance of the object.

18 Claims, 10 Drawing Sheets

(51) Int. Cl.
*B60Q 1/22* (2006.01)
*B60Q 1/34* (2006.01)
*B60Q 1/44* (2006.01)
*B60R 11/00* (2006.01)
*B60R 11/04* (2006.01)

(56) References Cited

U.S. PATENT DOCUMENTS

| | | |
|---|---|---|
| 9,102,271 B2 | 8/2015 | Trombley et al. |
| 10,266,023 B2 | 4/2019 | Mattern et al. |
| 10,384,609 B2 | 8/2019 | Zhang et al. |
| 10,417,816 B2 | 9/2019 | Satzoda et al. |
| 2015/0201478 A1* | 7/2015 | Wittorf .................. B60Q 1/20 315/82 |
| 2019/0349571 A1 | 11/2019 | Herman et al. |
| 2020/0148018 A1* | 5/2020 | Lavoie ................. G05D 1/0257 |
| 2023/0204781 A1* | 6/2023 | Thakur ................. G01S 17/894 356/5.01 |

* cited by examiner

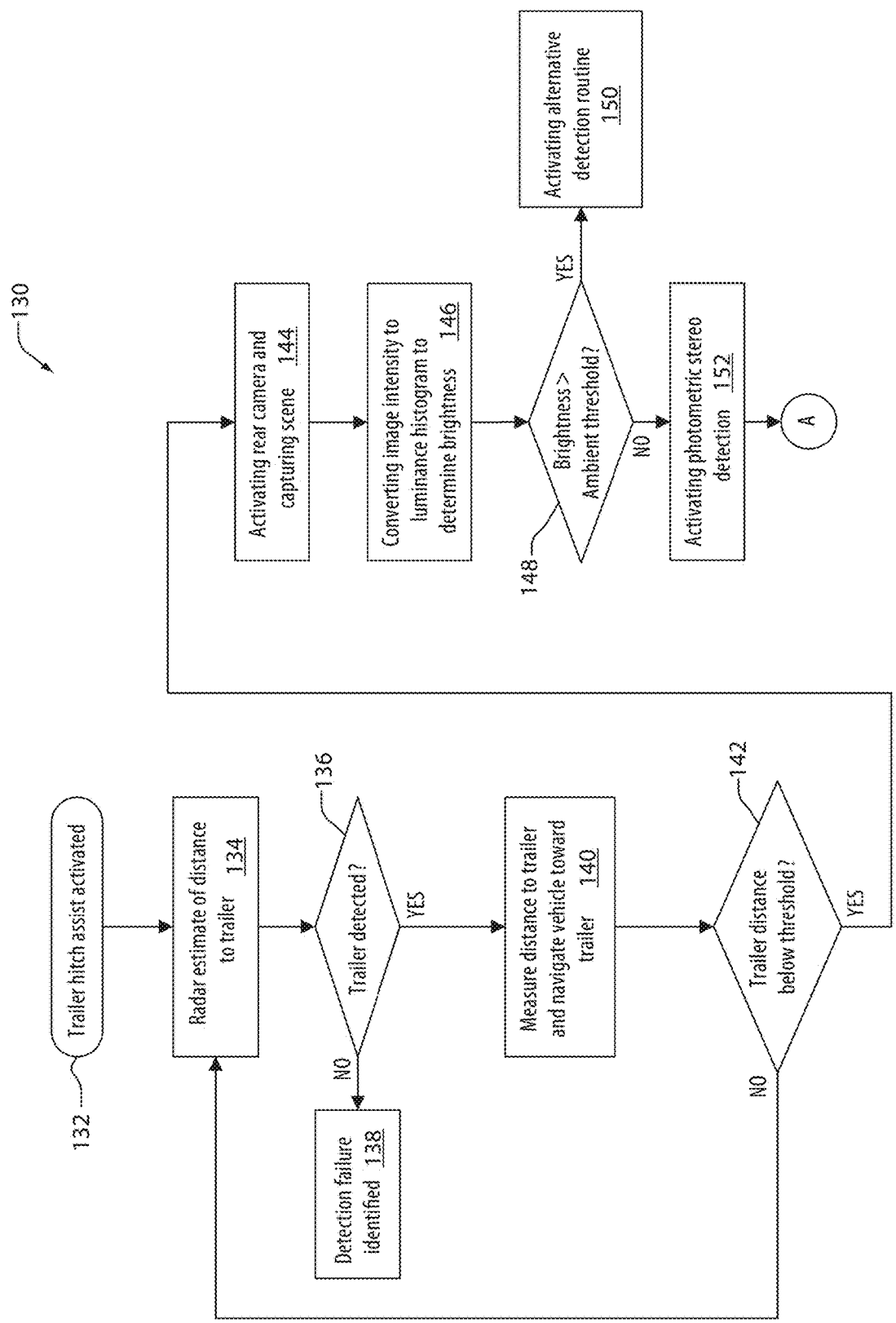

ASSISTED VEHICLE OPERATION WITH IMPROVED OBJECT DETECTION

FIELD OF THE DISCLOSURE

The present disclosure generally relates to a system for assisting in a vehicle-trailer hitching operation. In particular, the present disclosure relates to a system for improved object detection for assisted vehicle operation.

BACKGROUND OF THE DISCLOSURE

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstances, never actually be seen by the driver. This lack of sightlines requires an inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Accordingly, further advancements may be desired.

SUMMARY OF THE DISCLOSURE

According to one aspect of the present disclosure, a vehicle control system comprising a camera configured to capture a field of view proximate the vehicle is disclosed. The vehicle control system further comprises a plurality of light sources in connection with the vehicle and a controller. The controller is configured to activate a plurality of lights in an alternating pattern and capture light reflected from at least one object with the camera at a time and corresponding to the alternating pattern of the plurality of lights. In response to variations in the light impinging upon the at least one object from the alternating pattern, the controller is configured to identify depth information for at least one pixel of the image data corresponding to the location of the at least one object.

Examples of various aspects of the disclosure can include any one or a combination of the following features:
the controller identifies a distance from the vehicle to the at least one object by processing the depth information and the image data;
the at least one object comprises at least one of a surface contour of an operating terrain, an obstruction along a path of the vehicle, or a navigation target toward which the vehicle is navigated by the controller;
the plurality of light sources are spatially separated over a predetermined distance;
the flickering light pattern is activated by the controller by alternately activating the light sources across the spatial separation;
the image data depicting a field of view proximate to the vehicle is captured at a frame rate and the illumination frequency provides for an illumination duration of each of the light sources that extends over an exposure time of the camera at the frame rate;
the illumination frequency is greater than a flicker fusion threshold;
the flicker fusion threshold of the illumination frequency is at least 50 Hz;
the plurality of light sources comprise a first light source and a second light source in connection with opposing portions of the vehicle;
the light sources comprise a combination of two or more tail lights, reverse lights, turn indicators, headlights, fog lights, and auxiliary lights of the vehicle;
the camera is connected to a rear-directed portion of the vehicle and captures a rearward directed field of view;
the camera is in connection with at least one of tailgate portion and a center high-mount stop light of the vehicle;
at least one radar sensor configured to capture radar data;
the controller further identifies the object as a coupler of a trailer in at least one of the radar data and the image data;
the controller detects a coupler position of the coupler relative to the vehicle with the radar data;
the controller further controls a navigation system of the vehicle positioning within a predetermined distance of the trailer in response to the radar data;
the controller further activates the plurality of lights in the alternating pattern in response to the vehicle within the predetermined distance of the trailer;
the controller detects the coupler position with image data from the camera depicting the alternating pattern of the plurality of lights;
the variations in the illumination of the coupler of the trailer depicted in the image data are processed by the controller to detect a plurality of surface vectors identifying contours of the coupler;
the controller further generates a matrix of the surface vectors relative to the origin of each of the plurality of light sources;
the controller processes the matrix to identify the distance from the vehicle to the coupler;
a steering control system configured to control a steering angle of a plurality of steered wheels of a vehicle; and
the controller further controls a vehicle alignment routine adjusting a position of the vehicle and the steering angle aligning a hitch of the vehicle with a coupler position of a trailer.

According to another aspect of the present disclosure, a method for controlling a vehicle comprises activating a plurality of spatially separated lights of the vehicle in an alternating pattern at an illumination frequency. The flickering light pattern is activated by alternately activating the light sources across the spacial separation. The method further includes capturing light reflected from at least one object with a camera in connection with the vehicle at a timing corresponding to the alternating pattern and the illumination frequency. In response to variations in light impinging upon the object from the alternating pattern, the method further identifies a distance to the object from the vehicle.

Examples of various aspects of the disclosure can include any one or a combination of the following method steps or features:
the illumination frequency is greater than a flicker fusion threshold;
detecting a distance of the object relative to the vehicle;
navigating the vehicle within a predetermined distance of the object; and
activating the plurality of spatially separated lights of the vehicle in response to the vehicle within the predetermined distance of the object.

According to yet another aspect of the present disclosure, a vehicle control system comprises a camera configured to capture a field of view proximate to the vehicle and a plurality of light sources in connection with the vehicle. The light sources are spatially separated over a predetermined distance in connection with the vehicle. The system further provides for a controller that activates the plurality of light sources in an alternating pattern over the spatial separation at an illumination frequency greater than a flicker fusion threshold. The controller further captures light reflected from a coupler of a trailer with the camera at a timing corresponding to the alternating pattern at the illumination frequency. In response to variations in light impinging upon the coupler from the alternating pattern, the controller identifies a coupler position of the coupler of the trailer relative to the vehicle.

In various aspects of the disclosure, the control system may further comprise a steering controller configured to control a steering angle of a plurality of steered wheels of the vehicle. In such cases, the controller may further be configured to control the steering controller to navigate the vehicle along an alignment path that positions the vehicle within a predetermined distance of the coupler position. The controller may further activate a plurality of light sources in the alternating pattern in response to the vehicle within the predetermined distance.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 8A is a flow chart demonstrating a method for controlling a vehicle alignment routine by implementing a photometric stereo detection method within a predetermined distance of a coupler;

DETAILED DESCRIPTION OF THE PREFERRED EMBODIMENTS

Figure 1:
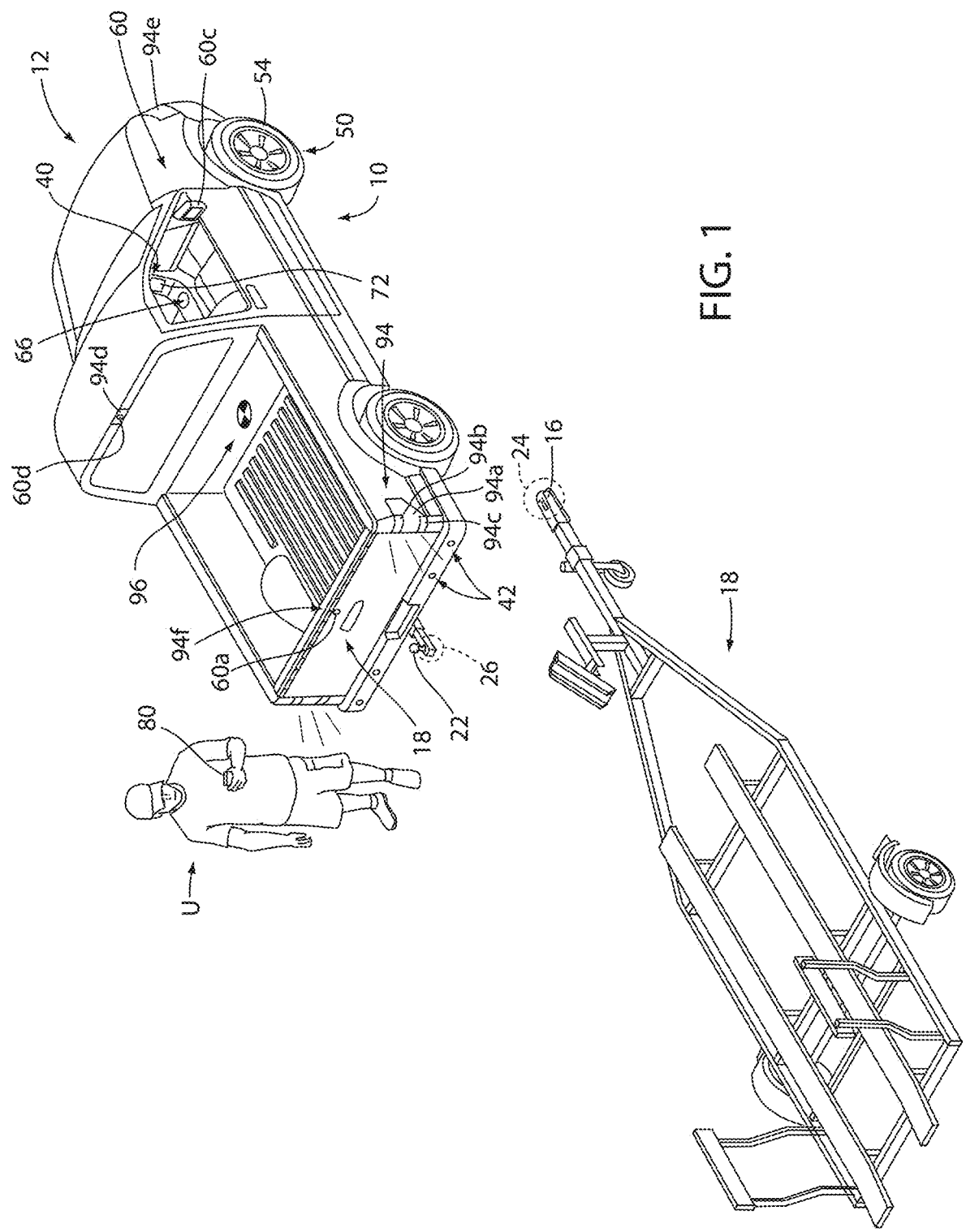
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction or the like does not mean that the feature or component follows a straight line or axis in such a direction or that it only extends in such direction or on such a plane without other directional components or deviations, unless otherwise specified.

Referring generally to FIGS. 1-4. reference numeral 10 designates a hitch assistance system (also referred to as a "hitch assist" system) for a vehicle 12. In various embodiments, hitch assist system 10 includes a controller 14 configured to acquire position data of a coupler 16 of a trailer 18. The controller 14 may be configured to derive a vehicle path 20 to align a hitch ball 22 of the vehicle 12 with the coupler 16. Deriving the vehicle path 20 may include a variety of steps including detecting and compensating for a change in a coupler position 24 in order to control the vehicle 12 to locate a hitch position 26 aligned with the coupler 16. The vehicle path 20 may comprise a plurality of segments 28, which may correspond to changes in the operating direction or steering direction of the vehicle 12. In various embodiments, deriving the vehicle path 20 may include navigating around intervening objects or structures, operating over uneven terrain, following a desired path indicated by an operator or user U, etc. Accordingly, the disclosure may provide for the hitch assist system 10 to provide for improved navigation of the vehicle 12 and/or interaction with the coupler 16 such that trailer 18 may be effectively connected to the vehicle 12 without complication.

In some implementations, the system 10 may be configured to utilize one or more image processing techniques to accurately identify the coupler position 24 in image data detected in a field of view directed rearward from the vehicle. In addition to the image data, the controller 14 may receive sensory information from one or more proximity sensors 30 or distance sensors (e.g., radar sensors, ultrasonic sensors, etc.). In general, the controller 14 may detect the coupler 16 of the trailer 18 in different sensor data (e.g., image data, proximity or radar data, etc.) depending on the distance $D_c$ of coupler 16 and the environmental conditions (e.g., ambient light, signal noise, object reflectivity, etc.). Accordingly, the disclosure provides for detection process that selectively activates different subroutines based on distance $D_c$ of coupler 16 and the environmental conditions in which the vehicle 12 is operating to limit operating faults and improve robust operation.

Figure 2:
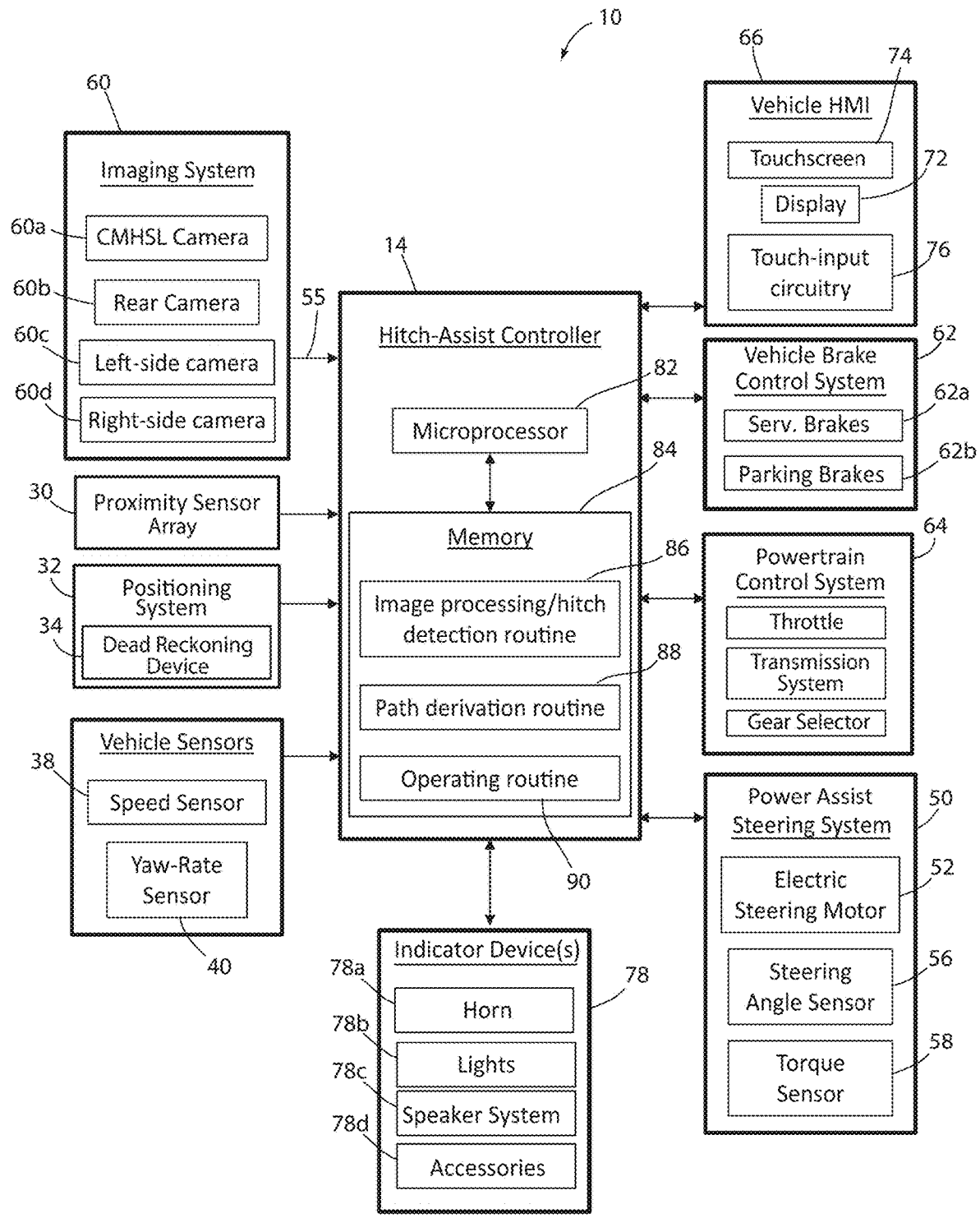
FIG. 2 is a diagram of a system according to an aspect of the disclosure for assisting in aligning the vehicle with a trailer in a position for hitching the trailer to the vehicle.
Figure 3:
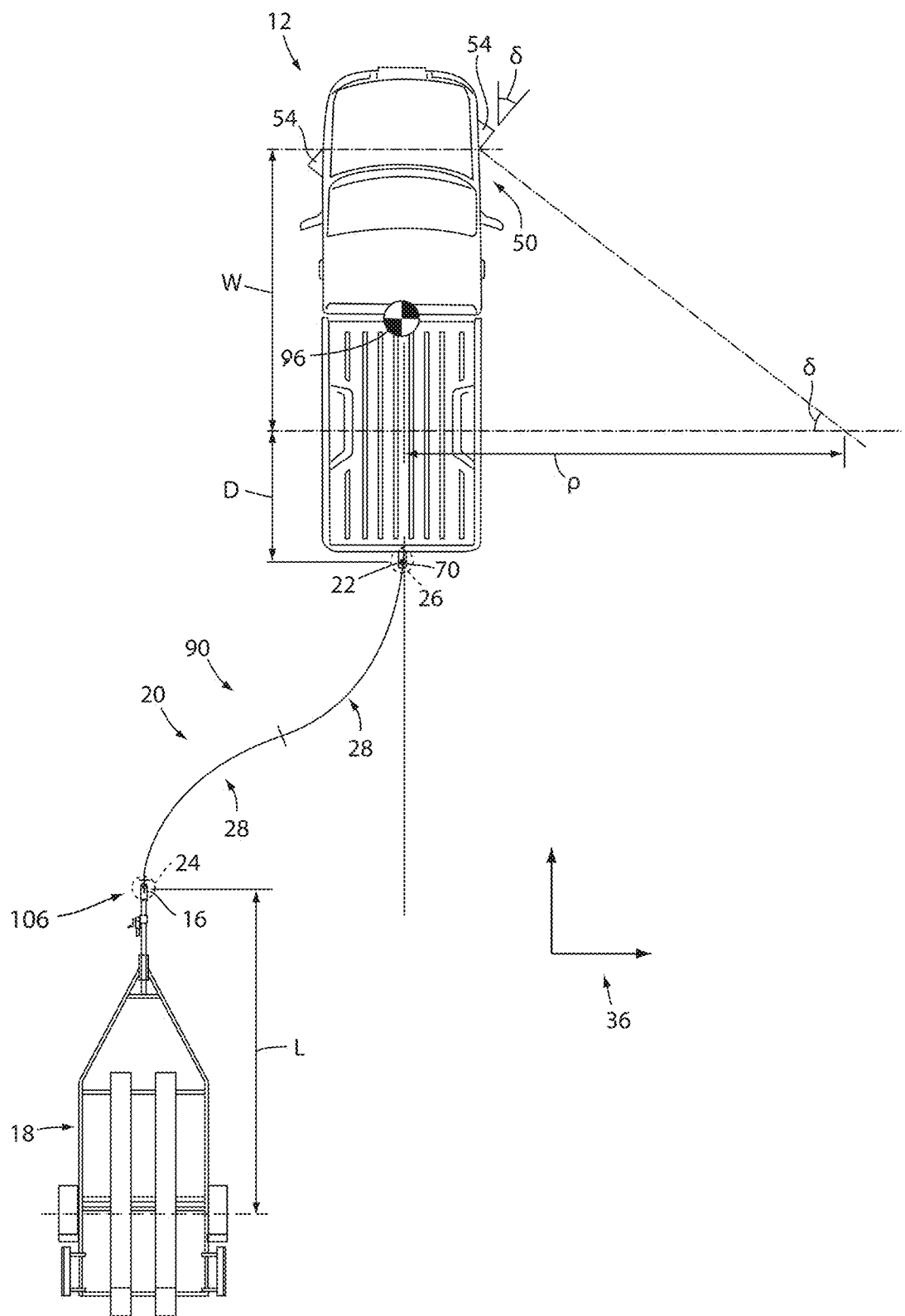
FIG. 3 is a plan view of a vehicle during a step of the alignment sequence with the trailer.
Figure 4:
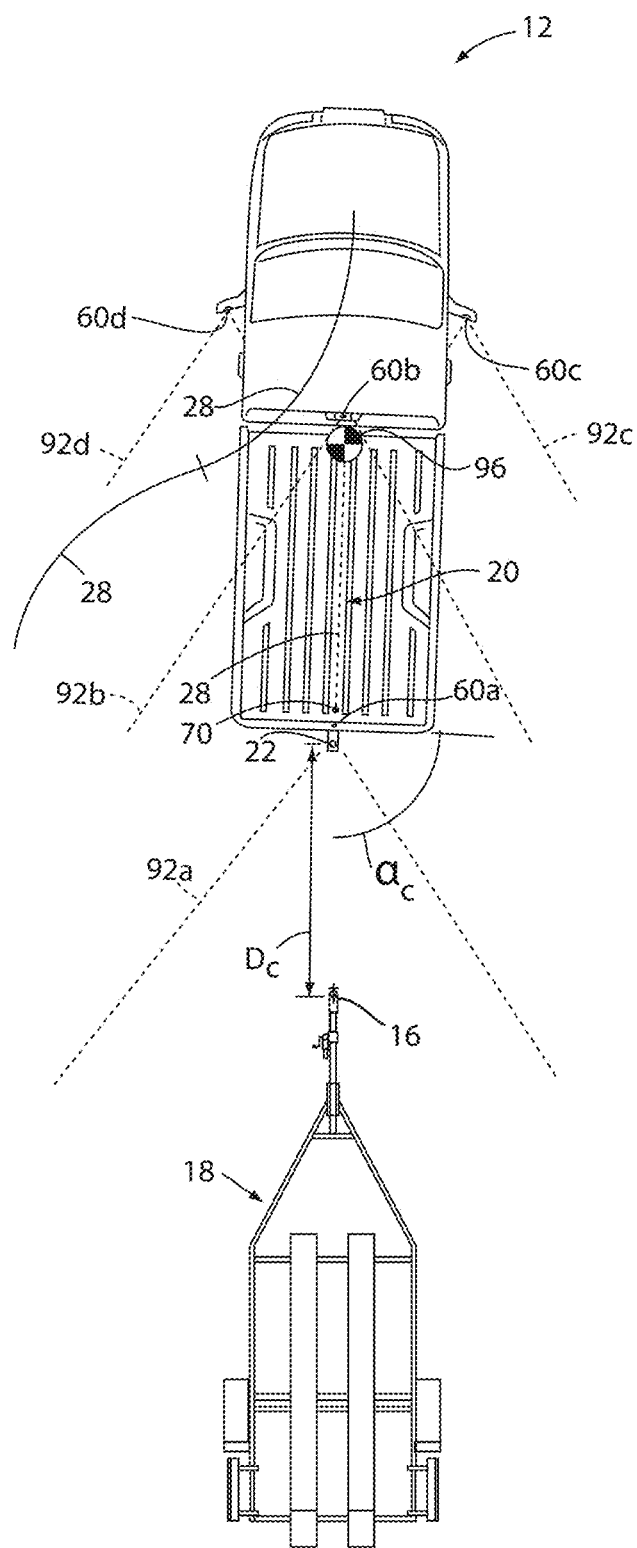
FIG. 4 is a plan view of a vehicle controlling the alignment sequence with the trailer.

With respect to the general operation of the hitch assist system 10, as illustrated in the system diagram of FIGS. 2-4, the system 10 includes various sensors and devices that obtain or otherwise provide vehicle status-related information. This information includes positioning information from a positioning system 32, which may include a dead reckoning device 34 or, in addition or as an alternative, a global positioning system (GPS), to determine a coordinate location of the vehicle 12 based on the one or more locations of the devices within the positioning system 32. In particular, the dead reckoning device 34 can establish and track the coordinate location of the vehicle 12 within a localized coordinate system 36 based at least on vehicle speed and steering angle δ as shown in FIG. 3. Other vehicle information received by hitch assist system 10 may include a speed of the vehicle 12 a speed sensor 38 and a yaw rate of the vehicle 12 from a yaw rate sensor 40.

As further shown in FIG. 2, one embodiment of the hitch assist system 10 is in communication with the steering system 50 of vehicle 12. The steering system 50 may be a power assist steering system 50 including a steering motor 52 to operate the steered wheels 54 (FIG. 1) of the vehicle 12 for moving the vehicle 12 in such a manner that the vehicle yaw changes with the vehicle velocity and the steering angle δ. In the illustrated embodiment, the power assist steering system 50 is an electric power-assisted steering ("EPAS") system including electric steering motor 52 for turning the steered wheels 54 to a steering angle δ based on a steering command, whereby the steering angle δ may be sensed by a steering angle sensor 56 of the power assist steering system 50. The steering command may be provided by the hitch assist system 10 for autonomously steering during a trailer hitch alignment maneuver and may alternatively be provided manually via a rotational position (e.g., steering wheel angle) of a steering wheel of vehicle 12.

In the illustrated embodiment, the steering wheel of the vehicle 12 is mechanically coupled with the steered wheels 54 of the vehicle 12, such that the steering wheel moves in concert with steered wheels 54, preventing manual intervention with the steering wheel during autonomous steering. More specifically, a torque sensor 58 is provided on the power assist steering system 50 that senses torque on the steering wheel that is not expected from autonomous control of the steering wheel and therefore indicative of manual intervention. In this configuration, the hitch assist system 10 may alert the driver to discontinue manual intervention with the steering wheel and/or discontinue autonomous steering. In alternative embodiments, some vehicles have a power assist steering system 50 that allows a steering wheel to be partially decoupled from the movement of the steered wheels 54 of such a vehicle.

With continued reference to FIG, 2, the power-assist steering system 50 provides the controller 14 of the hitch assist system 10 with information relating to a rotational position of steered wheels 54 of the vehicle 12, including a steering angle δ. The controller 14 in the illustrated embodiment processes the current steering angle, in addition to various vehicle 12 conditions, to guide the vehicle 12 along the desired path 20 (FIG. 3). It is conceivable that the hitch assist system 10, in additional examples, may correspond to an integrated component of the power assist steering system 50. For example, the power assist steering system 50 may include a hitch assist algorithm for generating vehicle steering information and commands as a function of all or a portion of information received from an imaging system 60, the power assist steering system 50, a vehicle brake control system 62, a powertrain control system 64, and other vehicle sensors and devices, as well as a human-machine interface ("HMI") 66, as discussed further below.

As also illustrated in FIG. 2. the vehicle brake control system 62 may also communicate with the controller 14 to provide the hitch assist system 10 with braking information, such as vehicle wheel speed, and to receive braking commands from the controller 14. The brake control system 62 may be configured to control service brakes 62a and a parking brake 62b. The parking brake 62b may correspond to an electronic parking brake system that may be in communication with the controller 14. Accordingly, in operation, the controller 14 may be configured to control the brakes 62a and 62b as well as detect vehicle speed information, which may be determined from individual wheel speed sensors monitored by the brake control system 62. Vehicle speed may also be determined from the powertrain control system 64, the speed sensor 38, and/or the positioning system 32, among other conceivable means. In some embodiments, individual wheel speeds can also be used to determine a vehicle yaw rate, which can be provided to the hitch assist system 10 in the alternative or in addition to the vehicle yaw rate sensor 40.

The hitch assist system 10 can further provide vehicle braking information to the brake control system 62 for allowing the hitch assist system 10 to control braking of the vehicle 12 during backing of the trailer 18. For example, the hitch assist system 10, may control the speed of the vehicle 12 during alignment of the vehicle 12 with the coupler 16 of trailer 18, which can reduce the potential for a contact with trailer 18, and can bring vehicle 12 to a complete stop at a determined endpoint 70 of the path 20. It is disclosed herein that the hitch assist system 10 can additionally or alternatively issue an alert signal corresponding to a notification of an actual, impending, and/or anticipated contact with a portion of trailer 18. The powertrain control system 64, as shown in the embodiment illustrated in FIG. 2, may also interact with the hitch assist system 10 for controlling speed and acceleration of the vehicle 12 during partial or autonomous alignment with trailer 18. As mentioned above, the control of the speed of the vehicle 12 may be advantageous to prevent contact from occurring with trailer 18.

As previously discussed, the hitch assist system 10 may communicate with a human-machine interface ("HMI") 66 of the vehicle 12. The HMI 66 may include a vehicle display 72, such as a center-stack mounted navigation or entertainment display (FIG. 1). HMI 66 further includes an input device, which can be implemented by configuring display 72 as a portion of a touchscreen 74 with circuitry 76 to receive an input corresponding with a location over display 72. Other forms of input, including one or more joysticks, digital input pads, or the like, can be used in place or in addition to touchscreen 74. Further, the hitch assist system 10 may communicate via wireless communication with another embodiment of the HMI 66, such as with one or more handheld or portable devices 80 (FIG. 1), including one or more smartphones. The portable device 80 may also include the display 72 for displaying one or more images and other information to a user U. For instance, the portable device 80 may display one or more images of the trailer 18 on the display 72 and may be further configured to receive remote user inputs via touchscreen circuitry 76. In addition, the portable device 80 may provide feedback information, such as visual, audible, and tactile alerts.

In some embodiments, the hitch assist system 10 may further be in communication with one or more indicator devices 78. The indicator devices 78 may correspond to conventional vehicle indicators, such as a vehicle horn 78a, lights, a speaker system 78c, vehicle accessories 78d, etc. In some embodiments, the indicator devices 78 may further include one or more accessories 78d, which may correspond to communication devices, remote controls, and a variety of devices that may provide for status and operational feedback between the user U and the vehicle 12. For example, in some embodiments, the HMI 66, the display 72, and the touchscreen 74 may be controlled by the controller 14 to provide status updates identifying the operation or receiving instructions or feedback to control the hitch assist system 10. Additionally, in some embodiments, the portable device 80 may be in communication with the controller 14 and configured to display or otherwise indicate one or more alerts or messages related to the operation of the hitch assist system 10.

Still referring to the embodiment shown in FIG. 2, the controller 14 is configured with a microprocessor 82 to process logic and routines stored in memory 84 that receive information from the above-described sensors and vehicle systems, including the imaging system 60, the power assist steering system 50, the vehicle brake control system 62, the powertrain control system 64, and other vehicle sensors and devices. The controller 14 may generate vehicle steering information and commands as a function of all or a portion of the information received. Thereafter, the vehicle steering information and commands may be provided to the power assist steering system 50 for affecting the steering of the vehicle 12 to achieve a commanded path 20 (FIG. 3) of travel for alignment with the coupler 16 of trailer 18. The controller 14 may include the microprocessor 82 and/or other analog and/or digital circuitry for processing one or more routines. Also, the controller 14 may include the memory 84 for storing one or more routines, including an image processing routine 86 and/or hitch detection routine, a path derivation routine 88, and an operating routine 90.

It should be appreciated that the controller 14 may be a stand-alone dedicated controller or may be a shared controller integrated with other control functions, such as integrated with a vehicle sensor system, the power assist steering system 50, and other conceivable onboard or off-board vehicle control systems. It should further be appreciated that the image processing routine 86 may be carried out by a dedicated processor, for example, within a stand-alone imaging system for vehicle 12 that can output the results of its image processing to other components and systems of vehicle 12, including microprocessor 82. Further, any system, computer, processor, or the like, that completes image processing functionality, such as that described herein, may be referred to herein as an "image processor" regardless of other functionality it may also implement (including simultaneously with executing image processing routine 86).

System 10 may also incorporate the imaging system 60 that includes one or more exterior cameras. Examples of exterior cameras are illustrated in FIG. 4 and include rear camera 60a, center high-mount stoplight (CHMSL) camera 60b, and side-view cameras 60c and 60d, although other arrangements including additional or alternative cameras are possible. In one example, imaging system 60 can include rear camera 60a alone or can be configured such that system 10 utilizes only rear camera 60a in a vehicle with multiple exterior cameras. In another example, the various cameras 60a-60d included in the imaging system 60 can be positioned to generally overlap in their respective fields of view, which in the depicted arrangement include fields of view 92a, 92b, 92c, and 92d to correspond with rear camera 60a, center high-mount stoplight (CHMSL) camera 60b, and side-view cameras 60c and 60d, respectively. In this manner, image data from two or more of the cameras can be combined in image processing routine 86, or in another dedicated image processor within imaging system 60, into a single image.

As an example of combining image data from multiple cameras, the image data can be used to derive stereoscopic image data that can be used to reconstruct a three-dimensional scene of the area or areas within overlapped areas of the various fields of view 92a, 92b, 92c, and 92d, including any objects (obstacles or coupler 16, for example) therein. In an embodiment, the use of two images including the same object can be used to determine a location of the object relative to the two image sources, given a known spatial relationship between the image sources. In this respect, the image processing routine 86 can use known programming and/or functionality to identify an object within image data from the various cameras 60a, 60b, 60c, and 60d within imaging system 60. In either example, the image processing routine 86 can include information related to the positioning of any cameras 60a, 60b, 60c, and 60d present on vehicle 12 or utilized by system 10, including relative to a center 96 (FIG. 1) of vehicle 12, for example, such that the positions of cameras 60a, 60b, 60c, and 60d relative to center 96 and/or to each other can be used for object positioning calculations and to result in object position data relative to the center 96 of vehicle 12, for example, or other features of vehicle 12, such as hitch ball 22 (FIG. 1), with known positions relative to center 96 of the vehicle 12.

In addition to or as an alternative to a stereoscopic imaging method, the system 10 may be configured to detect depth information of one or more objects captured in a single field of view of one of the cameras 60 via a photometric stereo imaging technique. In operation, the system may activate a plurality of light sources 94 in connection with the vehicle 12 that are spatially separated over a predetermined distance. The predetermined distance may be related to the separation of the light sources 94 mirrored or separated across a body or structure of the vehicle. In this configuration, each of the light sources 94 may have a predetermined spacing between each other, the camera 60 (e.g., the rear camera 60a, CHMSL camera 60b, etc.), and the hitch ball 22. Accordingly, when the light sources are activated in concert with the camera, the coupler position 24 may be calculated by the controller 14 relative to the camera 60 and the hitch ball 22. In this way, the controller 14 may apply a photometric stereo imaging technique to identify the coupler position 24 relative to the hitch position 26 in order to calculate the vehicle path 20.

The light sources 94 may correspond to various operating lights and/or auxiliary lights in connection with the vehicle 12. The light sources 94 may include a combination of two or more tail lights 94a, reverse lights 94b, turn indicators 94c, CHMSL 94d, headlights 94e, fog lights, auxiliary lights 94f or other lights for a vehicle. In general, the controller 14 may activate two or more of the light sources that are spatially separated over a known distance in an alternating pattern to achieve the photometric stereo imaging technique. In operation, the controller 14 may operate the light source at a frequency that exceeds a flicker fusion threshold. In some cases, a flicker fusion threshold may be greater than 60 Hz and may be greater than 80 Hz or 100 Hz. In operation, the controller 14 may control a timing of exposures of the camera 60 to align with the timing of the illumination frequency of the light sources 94. In this way, the controller 14 may maximize reflected light from various surfaces of the object (e.g., the trailer 18 and coupler 16) captured by the camera 60 and minimize environmental light that is naturally or artificially present in the corresponding field of view 92 (e.g., 92a, 92b) of the respective camera 60 (e.g., 60a, 60b). Based on the image data depicting the reflected light, the controller 14 may detect contours of the operating terrain, a navigation target, and/or obstructions along the vehicle path 20. In some examples, the object may correspond to the coupler 16 of the trailer 18. In such cases, the controller 14 may detect contours of the trailer 18 and/or the coupler 16 and estimate surface normal vectors for pixels corresponding the contours. The surface normal vectors may then be utilized to estimate the depth or distance of the pixels representing the coupler 16 and the trailer 18. Further details of an exemplary photometric stereo image method are discussed in reference to FIGS. 5-8.

In some cases, an imaging system 60 may be used in combination with an array or suite of proximity sensors 30 or, more generally, sensors that do not rely on visible light for operation. For example, the controller 14 may process the image data in combination with data from the proximity sensor(s) 30 to generate enhanced image data that may be used to identify the distance $D_c$ to the coupler 16 as well as other objects in the operating area of the vehicle 12. The combined image and proximity data may generally be referred to as enhanced image data. By monitoring the enhanced image data, the controller 14 may monitor the coupler position 24, such that the system 10 may accurately align the hitch ball 22 with the coupler 16 of the trailer 18. In some cases, the proximity sensors 30 may include ultrasonic sensors that may accurately identify the proximity of objects in a short-range (e.g., less than 5 m). In some examples, the proximity sensors 30 may correspond to one or more radar sensors, which may operate in the W-band of the electromagnetic spectrum from 75-110 GHz and wavelengths from 2.4-4 mm. Examples of radar technologies that may be implemented by the system 10 include short-range radar (SRR) with a range up to approximately 30 m and long-range radar (LRR) with ranges exceeding 100 m. Accordingly, the proximity sensors 30 may be implemented in combination with the imaging system 60 to accurately detect objects relevant to the navigation of the vehicle 12.

The image processing routine 86 can be specifically programmed or otherwise configured to locate coupler 16 within image data. In one example, the image processing routine 86 can identify the coupler 16 within the image data based on stored or otherwise known visual characteristics of coupler 16 or hitches in general. In another embodiment, a marker in the form of a sticker, or the like, may be affixed with trailer 18 in a specified position relative to coupler 16 in a manner similar to that which is described in commonly-assigned U.S. Pat. No. 9,102,271, the entire disclosure of which is incorporated by reference herein. In such an embodiment, the image processing routine 86 may be programmed with identifying characteristics of the marker for location in image data, as well as the positioning of coupler 16 relative to such a marker so that the position 24 of the coupler 16 can be determined based on the marker location.

Additionally or alternatively, controller 14 may seek confirmation of the determined coupler 16, via a prompt on touchscreen 74. If the coupler 16 determination is not confirmed, further image processing may be provided, or user-adjustment of the position 24 of coupler 16 may be facilitated, either using touchscreen 74 or another input to allow the user U to move the depicted position 24 of coupler 16 on touchscreen 74, which controller 14 uses to adjust the determination of position 24 of coupler 16 with respect to vehicle 12 based on the above-described use of image data. Alternatively, the user U can visually determine the position 24 of coupler 16 within an image presented on HMI 66 and can provide a touch input in a manner similar to that which is described in commonly-assigned U.S. Pat. No. 10,266,023, the entire disclosure of which is incorporated by reference herein. The image processing routine 86 can then correlate the location of the touch input with the coordinate system 36 applied to image data shown on the display 72, which may be depicted as shown in FIG. 3.

As shown in FIG. 3, the image processing routine 86 and operating routine 90 may be used in conjunction with each other to determine the path 20 along which hitch assist system 10 can guide vehicle 12 to align hitch ball 22 and coupler 16 of trailer 18. In the example shown, an initial position of vehicle 12 relative to trailer 18 may be such that coupler 16 is only in the field of view 92c of side-view camera 60c, with vehicle 12 being positioned laterally from trailer 18 but with coupler 16 being almost longitudinally aligned with hitch ball 22. In this manner, upon initiation of hitch assist system 10, such as by user input on touchscreen 74, for example, image processing routine 86 can identify coupler 16 within the image data of camera 60c and estimate the position 24 of coupler 16 relative to hitch ball 22. The position 24 of the coupler 16 may be identified by the system 10 using the image data in accordance by receiving focal length information within image data to determine a distance $D_c$ to coupler 16 and an angle $\alpha_c$ of offset between coupler 16 and the longitudinal axis of vehicle 12. This information may also be used in light of the position 24 of coupler 16 within the field of view of the image data to determine or estimate the height $H_c$ of coupler 16. Once the positioning $D_c$, $\alpha_c$ of coupler 16 has been determined and, optionally, confirmed by the user U, the controller 14 can take control of at least the vehicle steering system 50 to control the movement of vehicle 12 along the desired path 20 to align the hitch ball position 26 of the vehicle hitch ball 22 with coupler 16.

Continuing with reference to FIGS. 3 and 4 with additional reference to FIG. 2, controller 14, having estimated the positioning $D_c$, $\alpha_c$ of coupler 16, as discussed above, can, in one example, execute path derivation routine 88 to determine vehicle path 20 to align the vehicle hitch ball 22 with coupler 16. In particular, controller 14 can have stored in memory 84 various characteristics of vehicle 12, including the wheelbase W, the distance from the rear axle to the hitch ball 22, which is referred to herein as the drawbar length L, as well as the maximum angle to which the steered wheels 54 can be turned $\delta_{max}$. As shown, the wheelbase W and the current steeling angle $\delta$ can be used to determine a corresponding turning radius $\rho$ for vehicle 12 according to the equation:

$$\rho = \frac{1}{W \tan \delta} \quad (1)$$

in which the wheelbase W is fixed and the steering angle $\delta$ can be controlled by controller 14 by communication with the steering system 50, as discussed above. In this manner, when the maximum steering angle $\delta_{max}$ is known, the smallest possible value for the turning radius $\rho_{min}$ is determined as:

$$\rho_{min} = \frac{1}{W \tan \delta_{max}} \quad (2)$$

Path derivation routine 88 can be programmed to derive vehicle path 20 to align a known location of the vehicle hitch ball 22 with the estimated position 24 of coupler 16 that takes into account the determined minimum turning radius $\rho_{min}$ to allow path 20 to use the minimum amount of space and maneuvers. In this manner, path derivation routine 88 can use the position of vehicle 12, which can be based on the center 96 of vehicle 12, a location along the rear axle, the location of the dead reckoning device 34, or another known location on the coordinate system 36, to determine both a lateral distance to the coupler 16 and a forward or rearward distance to coupler 16 and derive a path 20 that achieves the needed lateral and forward-backward movement of vehicle 12 within the limitations of steering system 50. The derivation of path 20 further takes into account the positioning of hitch ball 22, based on length L, relative to the tracked location of vehicle 12 (which may correspond with the center 96 of mass of vehicle 12, the location of a GPS receiver, or another specified, known area) to determine the needed positioning of vehicle 12 to align hitch ball 22 with coupler 16.

As discussed above, hitch assist system 10 can provide image data to image processing routine 86 that can be used by image processing routine 86 (by the process described above or by other available processes) to determine the height $H_b$ of hitch ball 22 (i.e., a vertical component of the data including the position 24 of coupler 16. The image data may be captured by one or more of the cameras 60a-d of the imaging system 60. Further, hitch assist system 10 can have stored in memory 84 or can otherwise determine the height $H_b$ of hitch ball 22. In one example, during an initial setup routine for hitch assist system 10, a user U can be prompted to install hitch ball 22 by way of assembling a ball mount including hitch ball 22 with a receiver positioned on the rear of vehicle 12. The user U can then be asked to measure the height $H_b$ of the hitch ball 22 (such as to the top or center thereof) and to enter that measurement into memory 84 by way of HMI 66, for example. In this manner, a number of different height measurements for a plurality of hitch balls used in connection with the particular vehicle 12 can be stored in memory 84 and can be selected by the user U. In some embodiments, hitch ball 22 may be within the field of view 92a of rear camera 60a such that image data can be processed to determine the height $H_b$ of hitch ball 22 on a real-time or on-demand basis.

Referring now to FIGS. 5-8, an improved apparatus and method for identifying an object proximate to the vehicle 12 is discussed in reference to the exemplary system 10. As previously discussed, the controller 14 may be configured to detect the coupler 16 by utilizing different sensory methods and devices at different distances. For example, some methods of detection may provide fix a higher accuracy of detection of objects or obstacles that may be encountered by the vehicle 12 depending on the distance of the objects, the local lighting, and other environmental conditions. In reference to the coupler 16, the system 10 may implement a first sensory detection apparatus or method to detect the coupler position 24 within a first distance range of the coupler distance $D_c$. Once the estimated distance $D_c$ to the coupler 16 is less than a predetermined distance threshold 100, the controller 14 may utilize a second sensory detection apparatus or method to detect the coupler position 24 within a second distance range of the distance $D_c$.

The first detection method of the system 10 may implement one or more of the cameras 60a-d of the imaging system 60 as well as the proximity sensors 30 (e.g., a radar or laser sensor) to detect the coupler position 24 at the first distance range (e.g. a distance greater than 5 m). The second detection method of the system 10 may implement also one or more of the cameras 60a-d in combination with the light sources 94a-f to detect the coupler position 24 via a stereometric imaging method. The second detection method may be activated when the coupler distance $D_c$ is within the predetermined distance 100. The effective distance for applying the second detection method may be limited first because photometric stereo imaging may require the light impinging upon the trailer 18 to be readily detected by the imaging system 60. Additionally, the operating range of the second method may be limited because the spatial separation of the light sources 94 may be insufficient to directionally illuminate the coupler 16 of the trailer 18 over long distances. The predetermined distance may be dependent on the local lighting conditions, the separation of the light sources 94, the intensity of the light sources 94, and the performance of the imaging system 60. Accordingly, the predetermined distance may be identified for specific vehicle models based on specific performance and dimensional characteristics.

Figure 5:
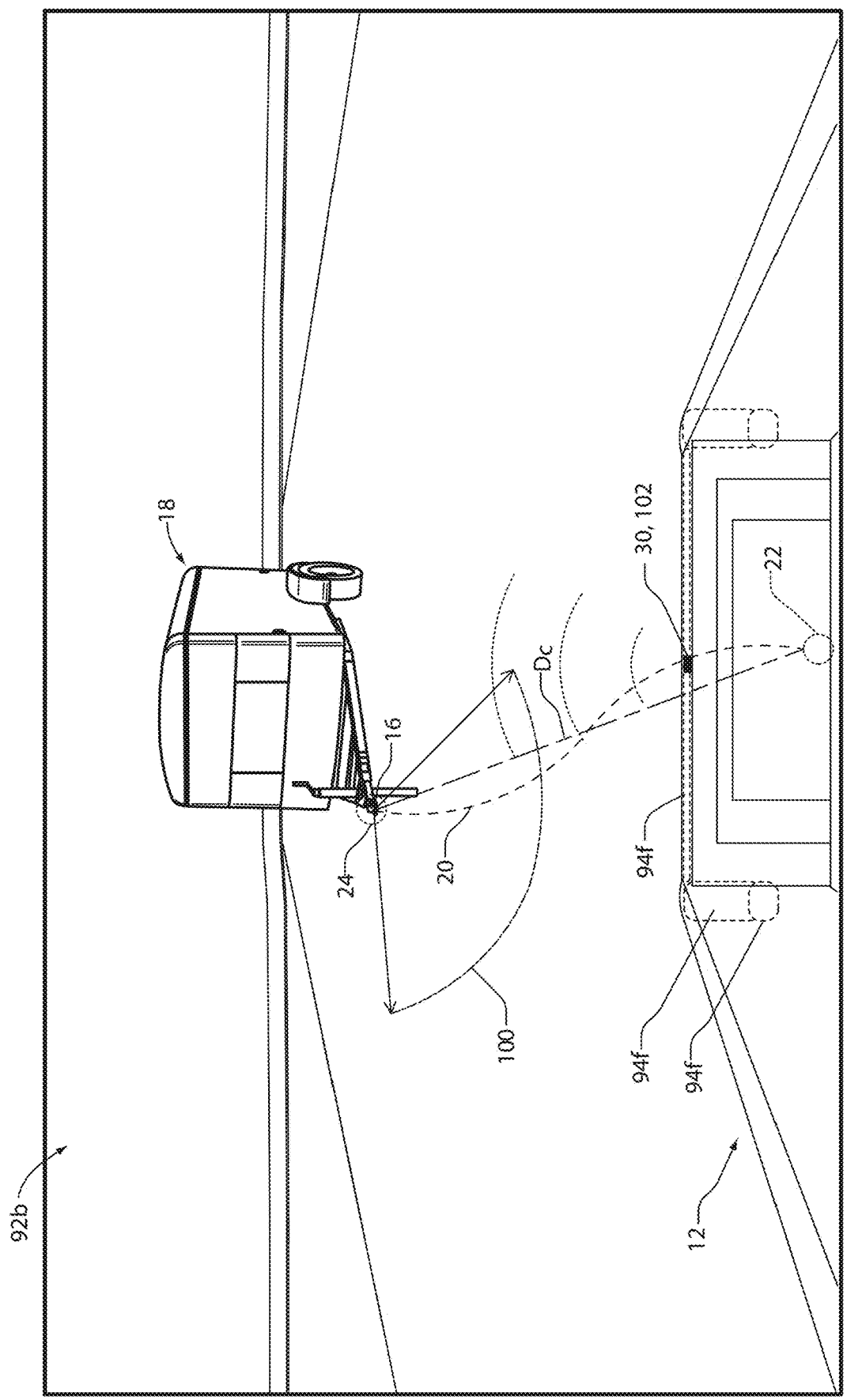
FIG. 5 is a diagram of a vehicle approaching a coupler of a trailer demonstrating a first coupler position detection method.
Figure 6:
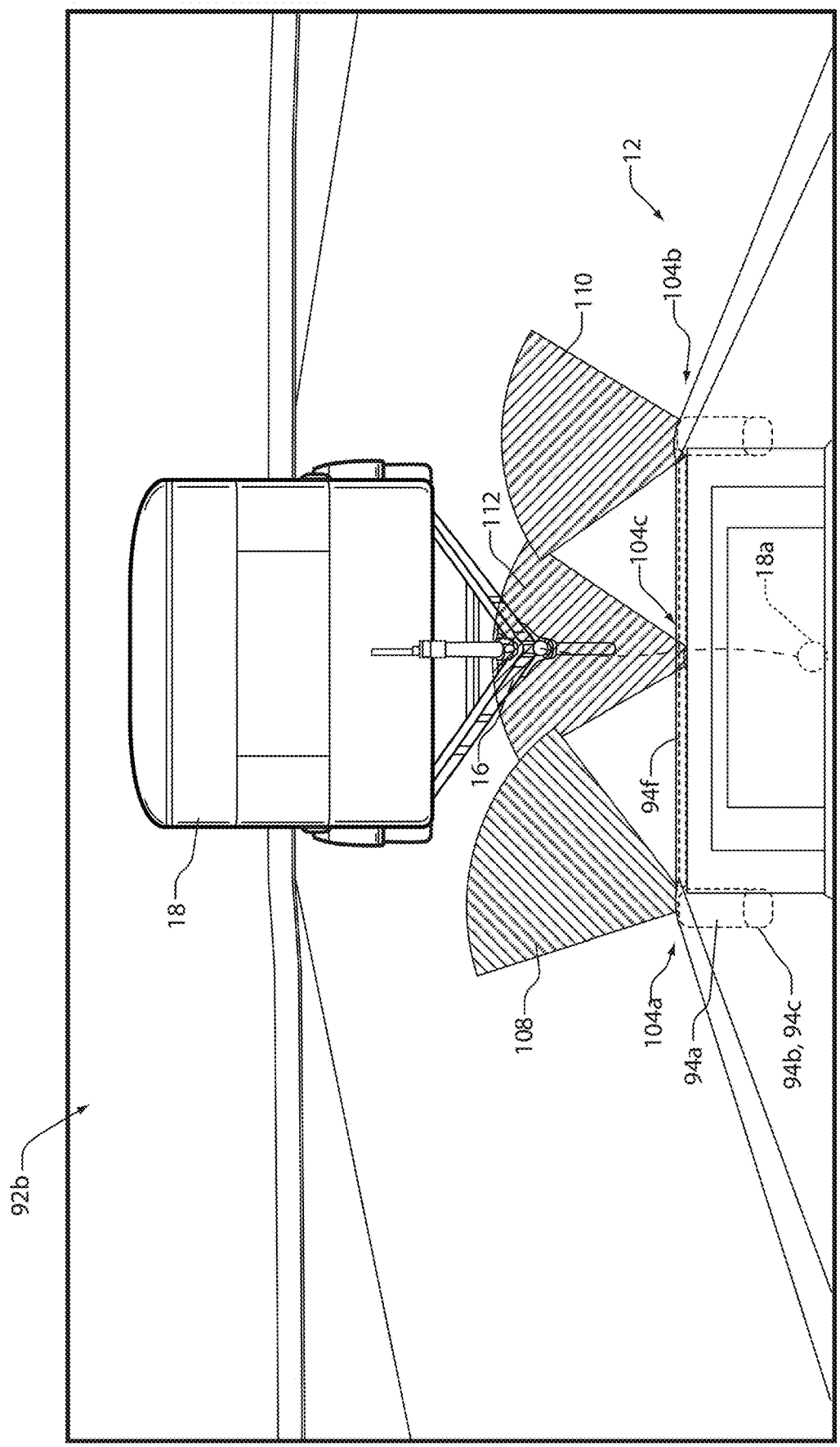
FIG. 6 is a diagram of a vehicle approaching a coupler of a trailer demonstrating a second coupler position detection method.

Referring to FIGS. 5, 6, and 7, the operation of the system 10 is generally described in reference to the vehicle operating in a semi-autonomous configuration. As shown, the vehicle 12 is navigated along the vehicle path 20 by the controller 14 of the system 10 to align the hitch ball 22 with the coupler 16 of the trailer 18. As demonstrated in FIG. 5, the vehicle 12 is located at a first distance range where the distance to the coupler $D_c$ is greater than a distance threshold 100. In such cases, the controller 14 may process image data from one or more of the cameras 60a-60d of the imaging system 60 as well as one or more of the proximity sensors 30 to estimate the coupler position 24 of the coupler 16. For example, when the vehicle is beyond the distance threshold 100, the controller 14 may implement one or more of the cameras 60a-60d of the imaging system 60, alone or in combination with the proximity sensor 30, to identify the distance $D_c$ to the coupler 16.

As demonstrated in FIG. 5, the proximity sensor 30 corresponds to a vehicle radar sensor 102 that may be implemented as a short-range radar (SRR) with a range of approximately 30 meters. In operation, the radar sensor 102 may communicate depth or range information as well as angular information identifying the proximity and direction of objects within a scanning region behind the vehicle 12 located within the field of view 92b. Accordingly, when the vehicle 12 is beyond the distance threshold 100, the controller may identify the trailer 18 in the image data represented in one or more of the fields of view 92a-92d captured by the imaging system 60 to identify the trailer 18 and a general direction of the coupler 16. Additionally, the controller 14 may process radar sensor data from the radar sensor 102 to estimate the distance to corresponding aspects of the image data, particularly the distance $D_c$ to the coupler 16. Upon estimating the coupler position 24 and the distance $D_c$ to the coupler 16, the controller 14 may apply the path derivation routine 88 and the operating routine 90 to navigate the vehicle 12 within the predetermined distance threshold 100 of the coupler 16.

Figure 7A:
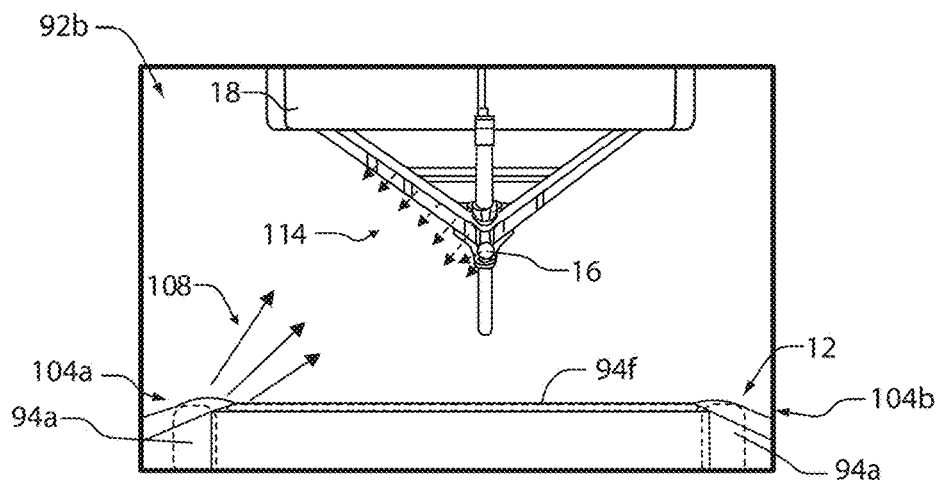
FIG. 7A is a diagram of a vehicle demonstrating a photometric stereo detection method to identify a coupler position of a trailer.
Figure 7B:
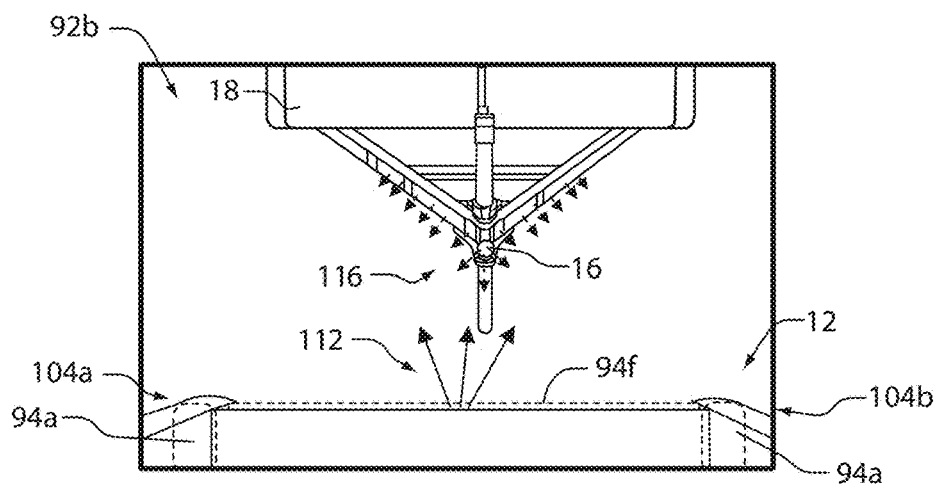
FIG. 7B is a diagram of a vehicle demonstrating a photometric stereo detection method to identify a coupler position of a trailer.

As depicted in FIG. 6, once the vehicle 12 has approached the coupler 16 of the trailer 18 within the distance threshold 100, the controller 14 may implement a second detection method that may more accurately detect the coupler position 24 and the coupler distance $D_c$. As shown in FIGS. 6, 7A, and 7B, the second or close range detection method may implement one or more of the light sources 94 of the vehicle to illuminate the coupler 16 and the trailer 18 with varying pattern of light. In the example depicted in FIG. 6, the light sources 94 may include the tail lights 94a, the reverse lights 94b, turn indicators 94c, and/or various segments of the auxiliary light 94f, each of which are rearward directed and illuminate the field of view 92b of the CHMSL camera 60b. In this configuration, the controller 14 may selectively activate a plurality of the light sources 94, which may be spatially separated over a lateral distance perpendicular to the rearward field of view. For example, the coupler 16 may be illuminated by emissions 108, 110, 112 output from a first side portion 104a, a second side portion 104b, and an intermediate portion 104c, respectively. In this way, the coupler 16 may be illuminated by light sources 94 extending over a width of the vehicle 12 in a pattern and timing that activates each of the first emission 108, the second emission 110, and the third emission 112 during a non-overlapping time interval.

By illuminating the object (e.g., trailer 18, coupler 16) with the different emissions 108, 110, 112 at different time intervals, the surfaces and reflected light associated with emissions 108, 110, 112 may reveal different contours or surface features in the image data. By aligning the timing of the camera 60b with the illumination of the emissions 108, 110, 112 the scene in the field of view 92b may be distinctly illuminated emphasizing the surface features that are normal to the vectors of the emissions 108, 110, 112. As shown, the vectors of the emissions 108, 110, 112 are depicted as arrows. In this way, a frequency of the illumination may be temporally aligned with the image data to depict the light associated with each of the emissions 108, 110, 112 in separate exposure intervals aligned with the pattern of the emissions 108, 110, 112. Based on the image data captured from this process, the controller 14 may identify the distance $D_c$ to the coupler 16 or various objects illuminated in the field of view 92b by utilizing a photometric stereo detection routine. Though discussed in reference to the CHMSL camera 60b, it shall be understood that the rear camera 60a or other cameras of the imaging system 60 may similarly be implemented to detect the depth of objects and terrain proximate to the vehicle 12.

As depicted in FIGS. 6, 7A, 7B, and 7C; the first emission 108 may be emitted from the tail light 94a on the first side portion 104a, and the second emission 110 may be emitted from the tail light 94a on the second side portion 104b of the vehicle 12. In addition to the reverse lights 94b, the auxiliary light source 94f may be positioned on an intermediate portion 104c between the side portions 104a and 104b. The auxiliary light source 94f may correspond to a light bar, that may be configured to independently illuminate a plurality of segments (see FIG. 1) extending along a width of the vehicle 12 between the side portions 104a, 104b. In this configuration, the controller 14 may activate one or more segments of the auxiliary light source 94f to project light emissions from various locations extending across the width and height of the vehicle 12. In this way, the controller 14 may illuminate a target (e.g., the coupler 16) from various intermediate locations positioned between the side portions 104a, 104b of the vehicle 12. Additionally, the controller 14 may selectively activate the CHMSL 94d to illuminate the coupler 16 from yet another intermediate portion 104c of the vehicle. Accordingly, though the emissions 104a, 104b, 104c are discussed in reference to specific light sources 94, the controller 14 may activate additional light sources of the vehicle 12 to illuminate the coupler 16 of the trailer 18.

Figure 7C:
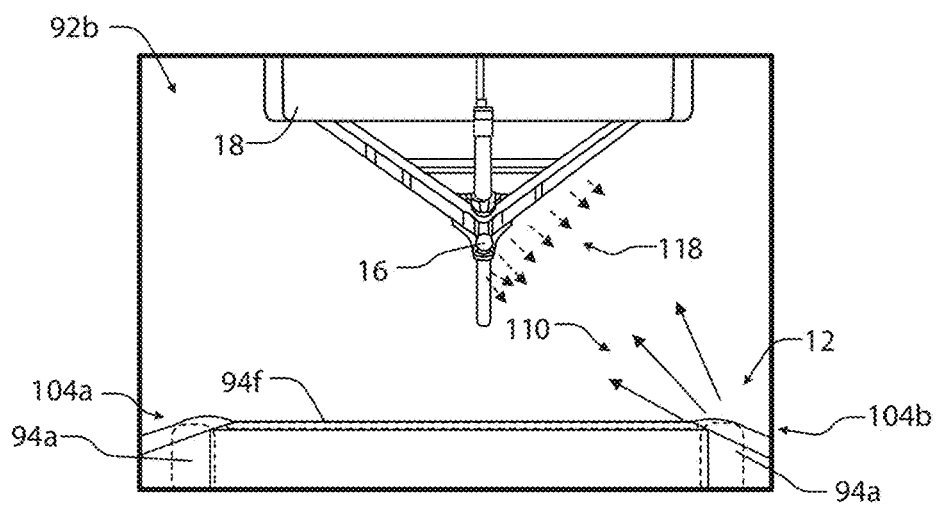
FIG. 7C is a diagram of a vehicle demonstrating a photometric stereo detection method to identify a coupler position of a trailer.

As depicted in FIGS. 7A, 7B, and 7C, an exemplary illumination pattern output from the vehicle lights 94 to illuminate the coupler 16 is shown in the field of view 92b. FIG. 7A demonstrates the first emission 108 output from the tail light 94a on the first side portion 104 and the resulting first reflection 114 reflected off the coupler 16. FIG. 7B demonstrates the third emission 112 output from the auxiliary light 94f and the resulting third reflection 118 from the coupler 16. Finally, FIG. 7C demonstrates the second emission 110 output from the tail light 94a on the second side portion 106 and the resulting second reflection 116 reflected from the coupler 16. In general, the illumination of the object (e.g., the trailer 18) in the field of view 92b may be illuminated sequentially at a frequency approximately commensurate to a duration of an exposure time for an image of the camera 60b at a frame rate. In some cases, the illumination frequency may even exceed the frame rate, such that the image data depicting each of the emissions 108, 110, 112 are depicted in the image data over multiple frames. For example, a frame rate may be approximately 30 frames per second (FPS) and the illumination frequency may be approximately 10 Hz. As discussed later, in some cases, light sources be incorporated on the vehicle 12 configured to emit light at near infrared wavelengths (e.g., 680 nm to 2500 nm) or infrared wavelengths (e.g., 700 nm to 1 mm). In general, visible light, as discussed herein, may correspond to wavelengths ranging from approximately 400 nm to 700 nm. In such implementations, the light captured by the cameras of the imaging system 60 may be filtered to emphasize the wavelengths of light output from the light sources.

As referred herein, the term "approximate" may correspond to values similar to those specified to account for variations in operation, error, or delays in timing. In general, such approximate values may correspond to ranges of +/−5% to 10% or more in timing, which may be offset by including programming and/or processing delays or pauses in the capture and processing of the image data. Accordingly, the alignment of the illumination frequency with the frame rate as described may be approximate or provide for a substantial or effective alignment of the exposure of the image data to the illumination of the emissions 108, 110, 112. In some cases, the alignment of the exposures of the image frames may not be 1:1 with the illumination frequency. For example, multiple frames of image data may be captured over a period corresponding to a single illumination of the light sources 94 at the illumination frequency. Alternatively, each of the image frames may include a plurality of illumination pulses from one of the light sources 94 (e.g., two instances of the first emission 108). In this configuration, a first image frame may include image data depicting the multiple emissions from one of the light sources 94 from a first point of origin, and a second image frame may include image data depicting the multiple emissions from one of the light sources 94 from a second point of origin, where each of the points of origin are spatially separated of a predetermined or know distance. In this way, the controller 14 may control the frame rate of the image data captured by the camera 60b of the imaging system to effectively, substantially, or approximately align temporally with the illumination frequency in a number of ways.

In some cases, the controller 14 may activate the light sources 94 to rapidly illuminate one or more objects in the field of view 92b at a rate that may generally be imperceptible to the human eye. For example, the controller 14 may rapidly oscillate each of the first, second, and third emissions 108, 110, 112 in an illumination pattern at an illumination frequency that may be in excess of a flicker fusion threshold (e.g., approximately 50 Hz or 60 Hz). In concert with the activation of the light pattern of each of the emissions 108, 110, 112, the controller 14 may capture images with exposure times aligned with the frequency of the alternating pattern emitted from the light sources 94. In this way, the controller 14 may capture image data that depicts the reflections resulting from each of the first, second, and third emissions 108, 110, 112. A photometric image processing routine may then be applied to the image data to detect the relative depth of each of the pixels representing the coupler 16 and the trailer 18 in the image data.

As previously discussed, the alternating pattern output from the light sources 94 may be implemented at a rate in excess of a flicker fusion threshold. For clarity, the flicker fusion threshold may correspond to a frequency at which a flickering or intermittent light stimulus appears to be steady or unwavering to a human observer while at the same time the camera is capable of accurately capturing the light response behavior of the surfaces over time. In general, a flicker fusion threshold may correspond to a frequency in excess of 60 Hz or 80 Hz and may be implemented with a variety of light sources. For example, light-emitting diodes (LED) light sources may be implemented at frequencies in excess of 80 Hz. Additionally, the exposure time of the camera (e.g., CHMSL camera 60b) of the imaging system 60 may be selected to provide high frequency image capture that may be aligned with the illumination frequency from each of the light sources 94. In this way, the system 10 may provide for the light sources 94 of the vehicle to be implemented with a single imager or camera to identify depth information for each of the pixels in the image data depicted in the field of view 92b via the photometric stereo imaging routine as discussed herein. Further details of the detection and navigation routine of the system are now discussed in reference to the flowcharts demonstrated in FIGS. 8A, 8B, and 8C.

Figure 8B:
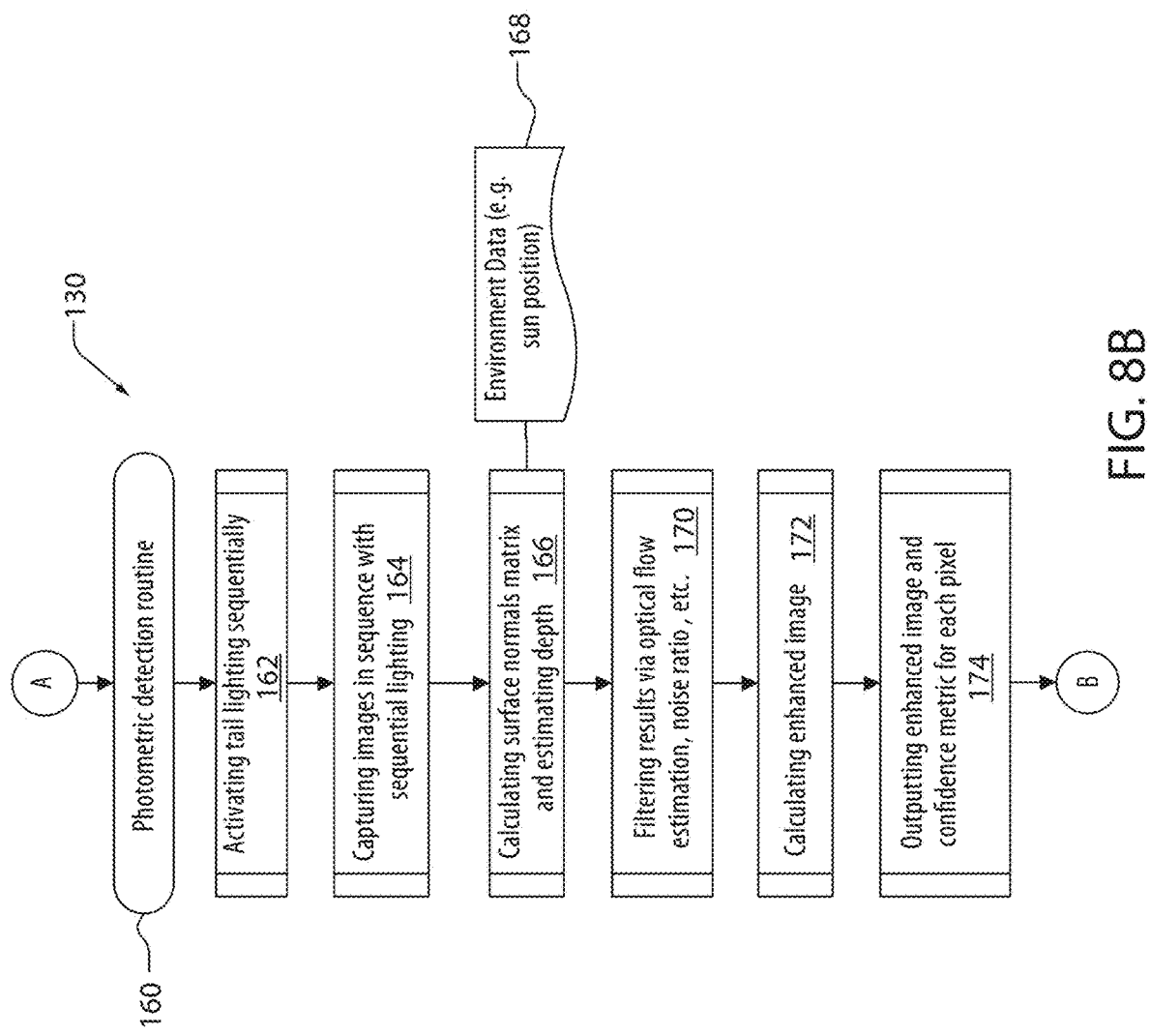
FIG. 8B is a flow chart demonstrating a method for controlling a vehicle alignment routine continued from FIG. 8A.
Figure 8C:
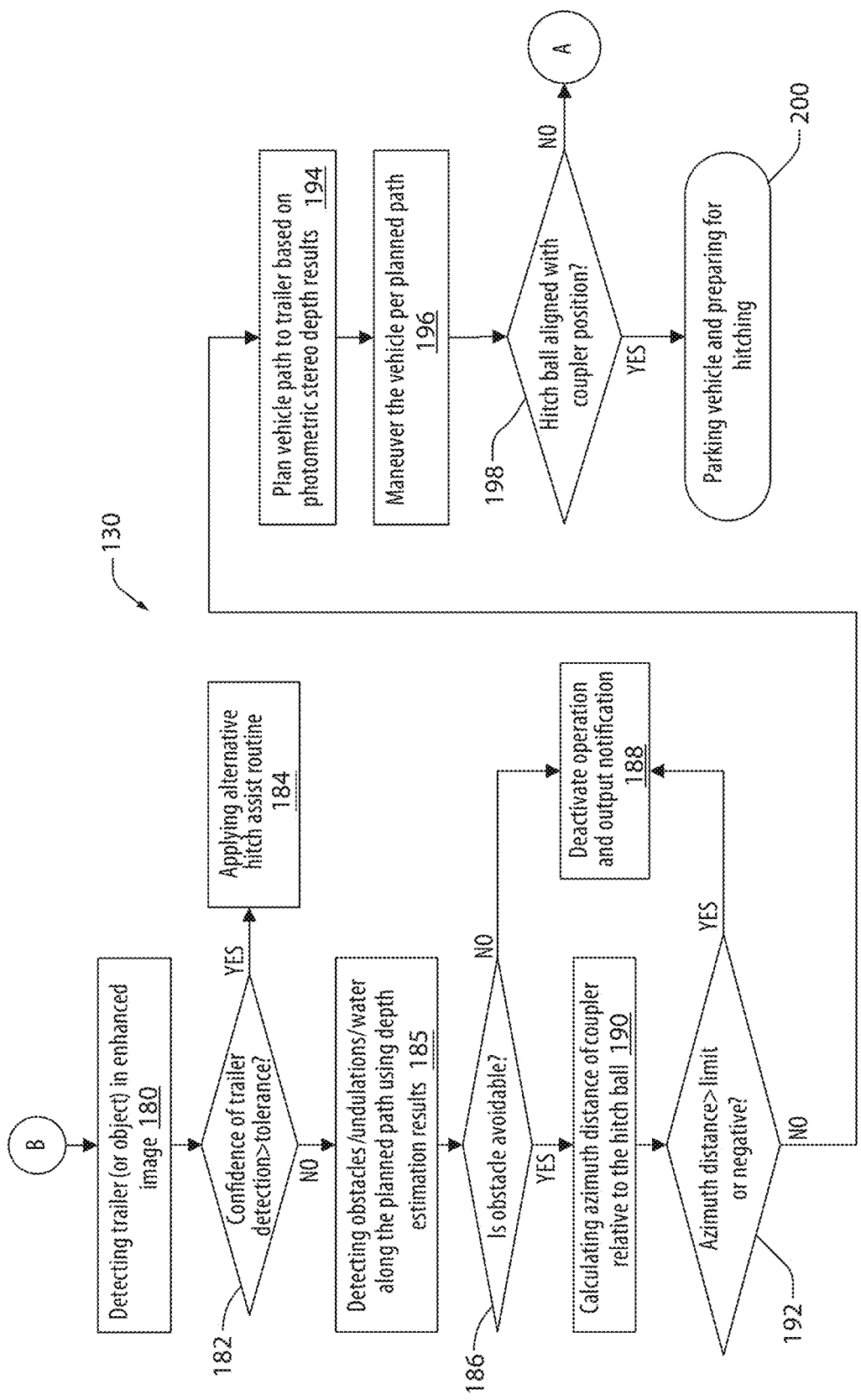
FIG. 8C is a flow chart demonstrating a method for controlling a vehicle alignment routine continued from FIGS. 8A and 8B in accordance with the disclosure.

Referring now to FIGS. 8A, 8B, and 8C; flowcharts demonstrating a method 130 of detecting objects along a semi-autonomous hitch assist vehicle path are shown. In operation, the method 130 may be initiated in response to an activation of a trailer hitch assist request by a user of the vehicle 12 (132). Once activated, the method 130 may initially estimate a distance to the trailer with the radar sensor 102 (134). In step 136, the method 130 may determine if the trailer 18 is detected. If the trailer is not detected in step 136, a detection error may be identified and reported to a user via the HMI 66 (138). If the trailer 18 is detected in the radar data, the method 130 may continue to measure the distance between the vehicle 12 and the trailer 18 and apply the path derivation and operating routines 88 and 90, to navigate the vehicle 12 toward the trailer 18 (140). The method 130 may continue to monitor the distance to the trailer 18 via the radar sensor 102 and navigate toward the trailer 18 until the distance to the trailer 18 (e.g., the distance $D_c$ to the coupler 16) is below the distance threshold 100 (142).

Once the vehicle 12 is identified within the distance threshold 100, the controller 14 may activate one or more of the cameras (e.g., the rear camera 60a, the CHMSL camera 60b, etc.) and capture the rearward directed scenes in one of the corresponding fields of view 92a, 92b (144). The image data communicated from the camera (e.g. CHMSL camera 60b) may then be converted by the controller 14 to a luminance histogram indicating a brightness of the scene captured in the field of view 92b (146). Once the scene brightness is determined, the controller 14 may determine if the scene brightness is in excess of an ambient light threshold in step 148. If the brightness exceeds the ambient threshold, the method 130 may continue to step 150 and activate an alternative detection routine. The alternate detection routine may correspond to an image-based detection routine without photometric stereo imaging enhancement (150). If the brightness is not in excess of the ambient threshold, the method 130 may continue to step 152 to activate a photometric stereo detection method as further discussed in reference to FIG. 8B and reference A.

Referring now to FIG. 5B, reference A refers to the initiation of a photometric detection routine 160. The photometric detection routine 160 may begin by activating the plurality of light sources 94 sequentially in a spatially separated illumination pattern (162). As previously discussed, the sequential illumination of the light sources 94 (e.g., tail lights 94a, auxiliary light 94f, etc.) may be activated at an illumination frequency. Accordingly, to capture the light associated with the emissions from the light sources 94, the controller 14 may control the camera (e.g., the CHMSL camera 60b) of the imaging system 60 to capture images with exposures corresponding to the illumination frequency and the sequence of the lighting pattern (164). Based on the image data and timing/origin of the corresponding emissions of the lighting sequence, the detection routine 160 may calculate surface vectors corresponding to normal vectors associated with the light reflected from the surfaces of the coupler 16 of the trailer 18 in response to the sequential lighting. The surface normal vectors may be stored in a matrix indicating constraints on the depth of each of the pixels associated with the surface normals (166). With the matrix including the surface normal values populated, the controller 14 may solve a matrix equation to compute Z values or depth values associated with the distance of each of the pixels relative to the camera 60b. To improve the accuracy of the depth estimate for each of the pixels in step 166, the controller 14 may factor in environmental data 168, which may include the position of the sun based on the geographic location of the vehicle 12 and the compass heading of the vehicle 12. Further, known geometric constraints, such as camera to ground height and the continuous nature of a road surface, may be used to compute a depth estimate with respect to a vehicle coordinate system.

The depth results may further be filtered based on a signal to noise ratio or other filtering methods that may remove or attenuate outlying results from the estimated depth information in the scene (170). In some implementations, the image data may additionally be filtered by one or more colors or wavelengths that may be associated with the light sources 94 of the vehicle 12 used to illuminate the target. For example, the light sources 94 may be configured to emit light at near infrared wavelengths (e.g., 680 nm to 2500 nm) or infrared wavelengths (e.g., 700 nm to 1 mm), which may be distinguished and filtered from typical ambient, visible light from the sun or artificial light sources (e.g. streetlights). In general, visible light, as discussed herein, may correspond to wavelengths ranging from approximately 400 nm to 700 nm. In such examples, the controller 14 may filter the image data focus on one or more specific color channels, wavelengths, or ranges of wavelengths that may correspond to the reflections 114, 116, 118 resulting from the emissions 108, 110, 112. In some cases, the depth results may be also be filtered via an optical flow filter or optical flow estimation, which may be particularly beneficial in filtering motion-related variations in the pixel data that are not associated with the movement of the vehicle 12 or the trailer 18. Accordingly, before utilizing the depth results from step 166, the controller 14 may filter the image data to verify and improve reliability.

In some cases, the image data may be partially occluded by one or more objects. Similarly, portions of the image data may yield results that are unsuitable for recognition due to obstructions (e.g., dirt, oil, dust, objects) that blurs or manifests as occlusions in the image data. In such cases, the controller 14 may apply a mask over portions of the image data that are not representative of the target object for alignment (e.g., the coupler 16). In operation, the controller 14 may identify obstructions as portions of the image data that do not correspond to the optical flow of the scene. Additionally, obstructions may be identified based on signal to noise filtering, appearance similarities, and various detection/filtering techniques. Accordingly, the controller 14 may enhance, mask, and/or filter the image data demonstrating the scene in various ways to improve the accuracy and reliability of the photometric detection routine 160.

As discussed in reference to step 168, the environmental data may be utilized by the controller 14 to filter or account for ambient/natural light. For example if an ambient or external light source (e.g., street lamp, sun, etc.) is detected in the image data, a component of the illumination of the coupler 16 detected during the photometric stereo imaging routine may be adjusted to account for or filter the corresponding ambient illumination from the image. Additionally, if the environmental data indicates a position of the sun, the controller 14 may be configured to utilize the direction of the natural light from the sun in combination with a compass bearing of the vehicle 12 to estimate the origin of the light associated with the sun. Based on the direction of the light emissions attributed to the sun, the controller 14 may implement the natural lighting as a light source for the photometric stereo imaging method. For example, the controller 14 may capture exposures with the camera 60b without any light sources 94 of the vehicle 12 activated and utilize the corresponding image data as a component of the surface normal matrix to estimate the depth in step 168. In this way, ambient or natural light with a known origin relative to the vehicle 12 may be utilized to supplement the light sources 94 to implement the photometric stereo depth detection for the image data. In another example, the camera may capture an image with ambient illumination only and then calculate the change per each subsequent vehicle illumination. Further, the calculation may take into account a change in spectral power density as a function of distance from the vehicle illumination source and thus normalize the change in intensity capture in the image.

Once the data is filtered or modified, an enhanced image of the scene may be calculated, identifying the depth and corresponding distance of each of the pixels represented in the image (172). The enhanced image provides an accurate estimation of the distance from the camera 60b to the coupler 16 of the trailer 18. With this information, the controller 14 may identify the distance $D_c$ from the hitch ball 22 to the coupler position 24 based on the known relationship between the hitch ball 22 and the camera 60b. More generally, the enhanced image data in a confidence matrix representing each pixel may be output from the photometric detection routine 160 in step 174. Upon completion of the photometric detection routine 160, the method 130 may continue to reference B, which is further discussed in reference to FIG. 8C.

Referring now to FIG. 8C, the method 130 may continue from the photometric detection routine 160 and implement the enhanced image data to assist in the guidance of the vehicle 12 along the vehicle path 20. Following reference B, the method 130 may continue to detect the trailer 18 in the enhanced image data (180). As previously mentioned, the enhanced image data may include a confidence metric that maybe compared to a tolerance in step 182. If a noise level is greater than the tolerance, the method 130 may apply an alternative hitch assist routine, which may include an imaging method that utilizes natural or ambient light (184). If the noise is within the tolerance in step 182, the method 130 may continue to scan the enhanced image data for significant variations in depth that may correspond to obstacles, undulations, water, etc. along the vehicle path 20 (185). The obstacles described in step 185 may correspond to variations in depth that are not associated with the trailer 18. Accordingly, the method 130 may provide for obstacle detection based on the depth estimation results from the image data to improve the path derivation routine 88.

Upon detection of an obstacle, the controller may apply the path derivation routine 88 to determine if the obstacle is avoidable based on the turning radius $\rho_{min}$ to allow the path 20 to navigate around the obstacle (186). If the obstacle is not avoidable, the controller 14 may deactivate the assisted vehicle operation routine and output a notification to the user via the HMI 66 (188). If the obstacle is avoidable, the method 130 may continue to calculate an azimuth distance of the coupler 16 relative to the hitch ball 22 of the vehicle 12 (190). The azimuth distance includes an angular measurement of the approximate height of the coupler 16 relative to the hitch ball 22. Accordingly, if the azimuth distance is greater than a predefined limit or negative, the navigation operation of the vehicle 12 may be deactivated in step 188. In step 192, if the azimuth distance is determined to be negative, the height $H_c$ of the coupler 16 is less than the height of the hitch ball 22, which indicates that the height $H_c$ of the coupler 16 is inadequate to clear the hitch ball 22. Alternatively, if the azimuth distance is greater than the limit, the method 130 may similarly be deactivated in step 188 due to a variation in the coupler height $H_c$ exceeding the hitch ball 22 in height. The variation in height between the hitch ball 22 and the coupler 16 may be due to variations in the terrain of the path 20 between the vehicle 12 and the trailer 18. Based on step 192, impediments or obstacles to automated navigation steps of the operating routine 90 that otherwise could go undetected may be identified, such that the semi-autonomous operation of a vehicle 12 may be deactivated in step 188.

Following step 192, if the azimuth distance is not identified to exceed the limit or negative, the method 130 may continue to apply the path derivation routine 88 based on the coupler position 24 and distance $D_c$ to the coupler 16 identified from the enhanced image data (194). With the vehicle path 20 identified, the controller 14 may control the powertrain system 64, the brake control system 62, and the steering system 50 to maneuver the vehicle 12 along the path 20 (196). In addition to the image data captured by the imaging system 60, data from the proximity sensors 30 (e.g., ultrasonic, radar, etc.) may be implemented in combination with the photometric stereo image data to further enhance the detection of the objects and obstacles in the scene. As the vehicle 12 approaches the trailer 18, the controller 14 may continue to monitor the position of the hitch ball 22 relative to the coupler position 24 to determine if an accurate alignment between the vehicle 12 and the trailer 18 is achieved (198). Until the vehicle 12 is aligned with the trailer 18 for connection, the method 130 may continue to apply the detection routine 160 via reference A. Once the controller 14 identifies that the hitch ball 22 is aligned with the coupler position 24, the controller 14 may activate the parking brake 62b and adjust or instruct the user to place the vehicle 12 in a parked configuration (200).

As provided by the disclosure, the photometric detection routine 160 provides for the calculation of depth data associated with scenes depicting the environment surrounding the vehicle 12 while only requiring a monoscopic camera (e.g., cameras 60a-d). Additionally, the disclosure may provide for the sequential lighting required to effectuate the photometric detection routine 160 to be implemented without visual distraction. Accordingly, the disclosure provides for an improved detection method to assist in a semi-autonomous vehicle operation by implementing features that may already be incorporated in various vehicles. In this way, the system may provide for advanced detection features without requiring specialized hardware to be introduced.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A detection system for a vehicle comprising:
   a camera configured to capture image data depicting a field of view proximate to the vehicle;
   a plurality of light sources in connection with the vehicle, wherein the plurality of light sources comprise a first light source and a second light source in connection with opposing portions of the vehicle and include a combination of two or more tail lights, reverse lights, turn indicators, headlights, fog lights, or auxiliary lights of the vehicle; and
   a controller that:
   activates the plurality of light sources in an alternating pattern at an illumination frequency;
   captures the image data depicting light reflected from at least one object at a timing corresponding to the alternating pattern at the illumination frequency; and
   in response to variations in the light impinging upon the at least one object from the alternating pattern, identifies depth information for at least one pixel of the image data corresponding to a location of the at least one object.

2. The system according to claim 1, wherein the controller further:
   identifies a distance from the vehicle to the at least one object by processing the depth information and the image data.

3. The system according to claim 1, wherein the at least one object comprises at least one of a surface contour of an operating terrain, an obstruction along a path of the vehicle, or a navigation target toward which the vehicle is navigated by the controller.

4. The system according to claim 1, wherein the plurality of light sources are spatially separated over a predetermined distance.

5. The system according to claim 4, wherein the alternating pattern is activated by the controller by alternately activating the light sources across the spatial separation.

6. The system according to claim 4, wherein the image data depicting the field of view proximate to the vehicle is captured at a frame rate and the illumination frequency controls an illumination duration of each of the light sources that extends over an exposure time of the camera at the frame rate.

7. The system according to claim 4, wherein the illumination frequency is greater than a flicker fusion threshold of at least 50 Hz.

8. The system according to claim 1, wherein the field of view is directed rearward from the vehicle and the camera is in connection with at least one of a deck lid, a rear hatch, a tailgate portion, or a center high-mount stop light of the vehicle.

9. The system according to claim 1, further comprising at least one radar sensor configured to capture radar data, wherein the controller further:
   identifies the object as a coupler of a trailer in at least one of the radar data and the image data;
   detects a coupler position of the coupler relative to the vehicle with the radar data; and
   controls a navigation system of the vehicle positioning the vehicle within a predetermined distance of the trailer in response to the radar data.

10. The system according to claim 1, wherein the controller further:
    activates the plurality of light sources in the alternating pattern in response to the vehicle within a predetermined distance of a trailer; and
    identifies a coupler position of a coupler of the trailer with image data from the camera depicting the alternating pattern of light from the plurality of lights.

11. The system according to claim 10, wherein the variations in illumination of the coupler of the trailer depicted in the image data are processed by the controller to detect a plurality of surface vectors identifying contours of the coupler.

12. The system according to claim 11, wherein the controller further:
  generates a matrix of the surface vectors relative to an origin of each of the plurality of light sources; and
  processes the matrix to identify the distance from the vehicle to the coupler.

13. The system according to claim 1, further comprising:
  a steering control system configured to control a steering angle of a plurality of steered wheels of a vehicle, and wherein the controller further:
    controls a vehicle alignment routine adjusting a position of the vehicle and the steering angle aligning a hitch of the vehicle with the location of the object.

14. A method for controlling a vehicle comprising:
  activating a plurality of spatially separated lights of the vehicle in a pattern at an illumination frequency, wherein the pattern is controlled by activating the light sources over the spatial separation;
  capturing light reflected from at least one object with a camera in a field of view proximate to the vehicle at a timing corresponding to the pattern and the illumination frequency, wherein the image data depicting the field of view is captured at a frame rate and the illumination frequency controls an illumination duration of each of the light sources that extends over an exposure time of the camera at the frame rate; and
  identifying a distance to the object from the vehicle in response to variations in light impinging upon the object from the lights activated in the pattern.

15. The method according to claim 14, wherein the illumination frequency is greater than a flicker fusion threshold.

16. The method according to claim 14, further comprising:
  navigating the vehicle within a predetermined distance of the object; and
  activating the plurality of spatially separated lights of the vehicle in response to the vehicle within the predetermined distance of the object.

17. A control system of a vehicle comprising:
  a camera configured to capture image data depicting a field of view proximate to the vehicle;
  a plurality of light sources in connection with the vehicle, wherein the plurality of light sources are spatially separated over a predetermined distance and the plurality of light sources comprise a first light source and a second light source in connection with opposing portions of the vehicle and include a combination of two or more tail lights, reverse lights, turn indicators, headlights, fog lights, or auxiliary lights of the vehicle; and
  a controller that:
    activates the plurality of light sources in an alternating pattern over the spatial separation at an illumination frequency that is greater than a flicker fusion threshold;
    captures the image data representing light reflected from a coupler of a trailer at a timing corresponding to the illumination frequency; and
    in response to variations in light impinging upon the coupler from the alternating pattern, identifies a coupler position of the coupler of the trailer relative to the vehicle.

18. The control system according to claim 17, wherein the system further comprises:
  a steering controller configured to control a steering angle of a plurality of steered wheels of a vehicle; and the controller further:
    controls the steering controller to navigate the vehicle along an alignment path that positions the vehicle within a predetermined distance of the coupler position; and
    activates the plurality of light sources in the alternating pattern in response to the vehicle within the predetermined distance.

* * * * *